(No Model.)
E. WESTON.
SCALE AND INDEX FOR ELECTRICAL MEASURING INSTRUMENTS.
No. 527,034. Patented Oct. 2, 1894.
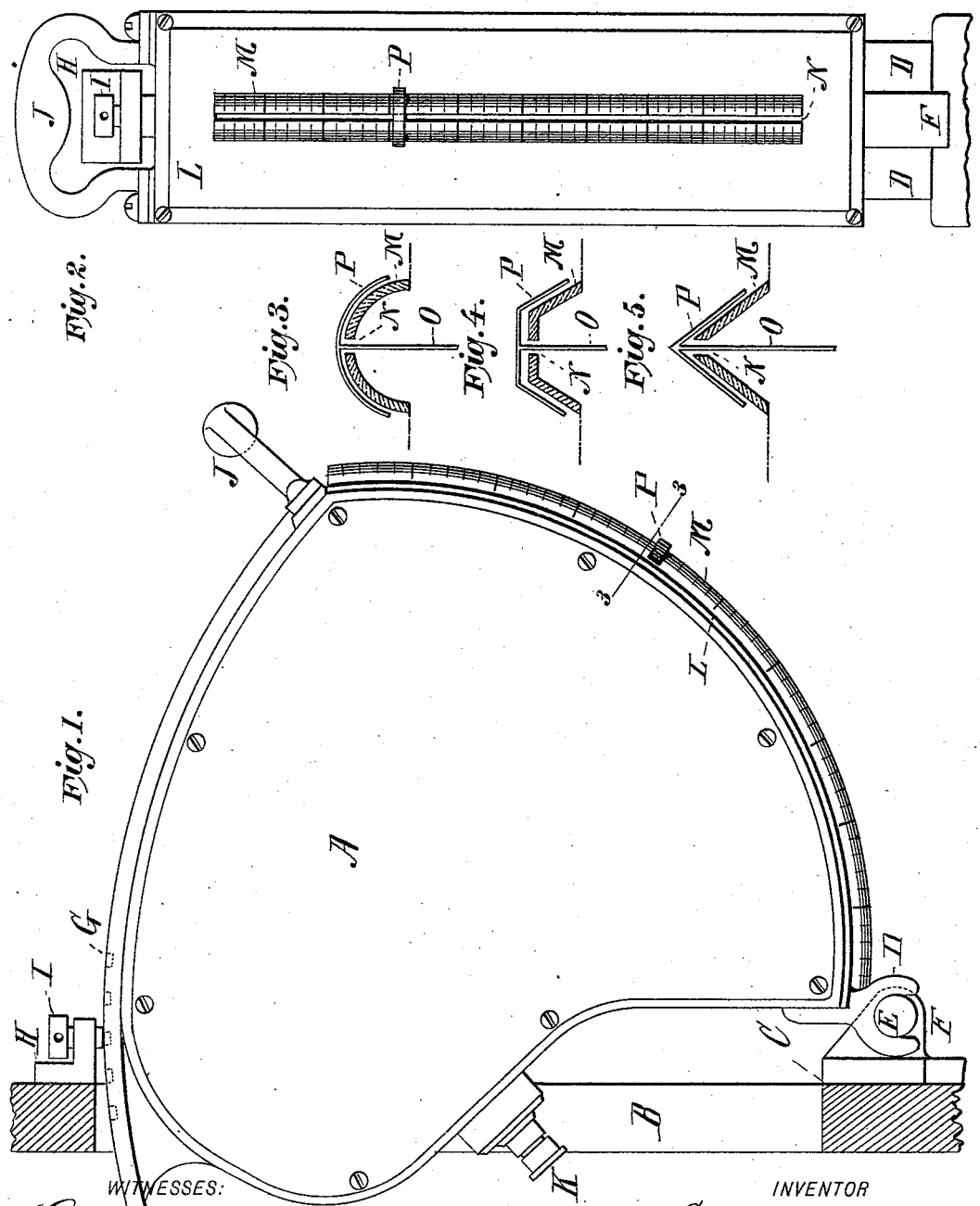

UNITED STATES PATENT OFFICE.

EDWARD WESTON, OF NEWARK, NEW JERSEY.

SCALE AND INDEX FOR ELECTRICAL MEASURING-INSTRUMENTS.

SPECIFICATION forming part of Letters Patent No. 527,034, dated October 2, 1894.

Application filed March 15, 1894. Serial No. 503,689. (No model.)

*To all whom it may concern:*

Be it known that I, EDWARD WESTON, of Newark, Essex county, New Jersey, have invented a new and useful Improvement in Scales and Indexes for Electrical Measuring-Instruments, of which the following is a specification.

The object of my invention is to provide a scale and index needle for an electrical measuring instrument, which can be read when the observer is standing at the side of the instrument as well as when he is placed directly in front of it.

The particular type of instrument to which my invention is here shown applied is that known as the edgewise variety, wherein the scale, instead of being put upon the flat face of the instrument is arranged on one edge thereof. The object of this edgewise construction is to enable more instruments to be placed upon a switchboard than otherwise would be possible.

In another application for Letters Patent, filed February 21, 1894, Serial No. 500,981, I have fully described and claimed a particular construction of edgewise instrument, which is the same as that shown in my present application, and to which my present invention is applied; and in the said application I have fully detailed the advantages of such an instrument.

My invention consists in the construction of the scale and the index needle substantially as hereinafter set forth.

In the accompanying drawings, Figure 1 is a side view of an edgewise measuring instrument placed in the switchboard. Fig. 2 is a view of the front edge, exhibiting the scale and index needle. Fig. 3 is a sectional view on the line 3, 3 of Fig. 1, the parts being here shown enlarged. Figs. 4 and 5 are respectively modifications in the shape of the scale and needle.

Similar letters of reference indicate like parts.

A is the body of the instrument, which is disposed in an opening, B, in switchboard C. At one corner of the instrument body, A, are provided yokes, D, which rest upon pivots, E, supported on bracket, F, which is attached to the switchboard C. The instrument therefore turns on these pivots, and may be adjusted at any desired angle in the switchboard so as to dispose the scale on this edge to the line of sight of the observer. The upper side of the case A is curved, and is provided on the edge with a series of recesses, G, which are regularly spaced. On the switchboard C is a bracket, H, carrying a screw, I, the end of which enters any one of the recesses G, and thus holds the instrument in any position in which it may be adjusted in its pivot. J is a handle for conveniently manipulating the apparatus, and K is one of the binding posts. The construction of the instrument so far described is the same as appears in my pending application aforesaid.

On the front edge, L, of the case A, is placed the scale plate M, which is shown as of convex or salient cross section. Extending longitudinally along the scale plate is a slot, N, through which passes an index needle, O, which needle is actuated by any suitable mechanism within the case A. The needle passes through the slot N, and on its outer extremity carries a curved bar, P, which, as shown in Figs. 1 and 3, extends around the curved scale plate M.

It will be obvious that as the scale is moved in one direction or the other by the mechanism within the case, it will traverse the scale plate M, and the reading will be taken from the position of the bar P with reference to the marking on said scale plate. It will also be apparent that the position of the bar P on the scale plate M may be readily seen by the observer, whether he is located directly in front of the instrument or at one side thereof; for, inasmuch as the scale marking extends around the scale plate M and the bar P also extends around said plate, it is as easy to observe the position of said bar from the side, as shown in Fig. 1, as from the front, as shown in Fig. 2. This is a great advantage, especially in electric lighting stations, where a large number of instruments are grouped upon a switchboard located in some definite part of the station, inasmuch as the attendant can read the indications of his apparatus from wherever he may be, without its becoming necessary for him to place himself directly in front of his instruments, or, when reading them from the side, to take into consideration the errors due to parallax.

In Fig. 4 the scale plate M is shown as of polygonal section instead of circular, the needle O being made of a corresponding shape.

In Fig. 5 the scale plate shows simply a salient angle, the slot being made at the apex, and the needle is again made to conform to that figure.

I claim—

1. In an indicating or measuring instrument a scale plate of salient cross-section, a movable index and transverse arm or projection on said index extending over said scale plate.

2. In an indicating or measuring instrument a scale plate of salient cross-section, a movable index and a transverse arm or projection on said index extending over said scale plate and conforming in shape to the cross-section thereof.

3. In an indicating or measuring instrument a scale plate of salient cross-section provided with a longitudinal slot, an index movable in said slot and a transverse arm or projection on said index extending over said scale plate.

4. In combination with an indicating or measuring instrument of the type herein specified and disposed on a curved edge thereof, a scale plate of salient cross-section and conforming longitudinally to the curvature of said edge, an index and a transverse arm or projection transverse to said index and extending over said scale plate.

EDWARD WESTON.

Witnesses:
H. R. MOLLER,
M. BOSCH.